United States Patent [19]

Horvath

[11] Patent Number: 4,728,386
[45] Date of Patent: Mar. 1, 1988

[54] APPARATUS FOR APPLYING PLASTIC FILM MATERIAL TO A GLASS SHEET

[75] Inventor: Steven C. Horvath, Mississauga, Canada

[73] Assignee: 528569 Ontario Limited, Mississauga, Canada

[21] Appl. No.: 801,891

[22] Filed: Nov. 26, 1985

Related U.S. Application Data

[63] Continuation-in-part of Ser. No. 664,724, Oct. 25, 1984, abandoned.

[51] Int. Cl.⁴ ............................................. B26D 5/28
[52] U.S. Cl. .................................... 156/361; 156/99; 156/363; 156/366; 156/494; 156/547; 156/552; 156/555
[58] Field of Search ........................... 156/549–551, 156/555, 552, 522, 494, 99, 102, 103, 107, 556, 361–363

[56] References Cited

U.S. PATENT DOCUMENTS

| | | | |
|---|---|---|---|
| 2,354,120 | 7/1944 | Haren | 156/361 |
| 3,081,212 | 3/1963 | Taylor | 156/164 |
| 3,479,242 | 11/1969 | Scott | 156/522 |
| 3,520,756 | 7/1970 | Denaro et al. | 156/99 X |
| 3,944,461 | 3/1976 | Ogron | 156/552 X |
| 4,025,380 | 5/1977 | Bernardo | 156/361 X |
| 4,029,833 | 6/1977 | Kosta | 118/253 X |
| 4,046,931 | 9/1977 | Innes et al. | 118/253 X |
| 4,338,152 | 7/1982 | Del Bianco | 156/361 X |

Primary Examiner—David Simmons
Attorney, Agent, or Firm—Robert F. Delbridge; Arne I. Fors

[57] ABSTRACT

Apparatus for applying plastic film material to a glass sheet has a first roller mounted for rotation about its longitudinal axis and having a rubber-like surface and a diameter of at least about 30 inches (75 cm). A second roller is mounted for rotation about its longitudinal axis adjacent to the first roller to form a nip between the first and second rollers. A length of plastic film material having adhesive on one surface is supplied under controlled tension to the first roller at a position remote from the second roller, with the opposite surface of the film material in contact with the first roller, to cause the film material to pass around a substantial portion of the circumference of the first roller to a position adjacent the second roller. The glass sheet is fed through the nip to cause the second roller to press the glass sheet towards the first roller and cause the film material to be adhered to the glass sheet.

6 Claims, 1 Drawing Figure

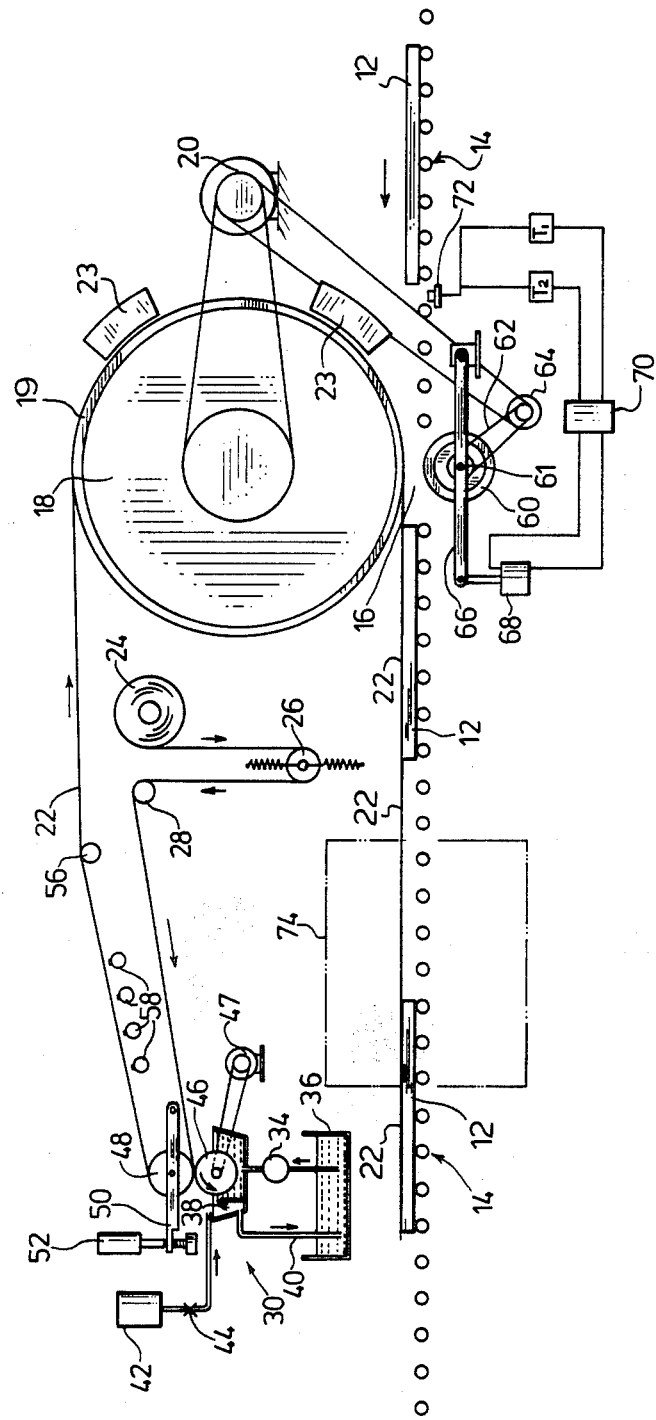

APPARATUS FOR APPLYING PLASTIC FILM MATERIAL TO A GLASS SHEET

This is a continuation-in-part of application Ser. No. 664,724 filed Oct. 25, 1984 (now abandoned).

This invention relates to apparatus for applying plastic film material to glass sheets.

Application of plastic film material to glass sheets provides various advantages. For example, windows may be made glare-reducing and more heat insulating, the product is relatively shatter-proof, and the plastic film material may be of any desired colour or design.

However, known apparatus for this purpose has the disadvantage that it is extremely difficult to avoid the occurrence of wrinkles or bubbles in the film material when applied to the glass sheets, with wrinkles tending to appear especially at the ends of a glass sheet in the form of longitudinally extending creases known as "fingers". It is therefore an object of the invention to provide improved apparatus in which the likelihood of such wrinkling is reduced.

According to the invention, apparatus for applying plastic film material to a glass sheet comprises a first roller mounted for rotation about its longitudinal axis, the first roller having a rubber-like surface and a diameter of at least about 30 inches (75 cm), means for rotating the first roller about its longitudinal axis, a second roller mounted for rotation about its longitudinal axis adjacent to the first roller to form a nip between the first and second rollers, and means for supplying a length of plastic film material having adhesive on one surface under controlled tension to said first roller at a position remote from the second roller, with the opposite surface of the film material in contact with the first roller, to cause the film material to pass around a substantial portion of the circumference of the first roller to a position adjacent the send roller, and means for feeding the glass sheet through the nip to cause the second roller to press the glass sheet towards the first roller and cause the film material to be adhered to the glass sheet.

The supply of the film material under controlled tension to the large first roller and the passage of the film material around a substantial portion of the circumference of the large first roller until the film material engages the glass sheet enables the film material to be applied to the glass sheet in a wrinkle and bubble-free manner. It is believed that it is the combination of the rubber-like surface and the large diameter of the first roller, providing a relatively shallow angle of contact of the film material with the glass sheet, especially upon initial engagement and during disengagement, which provides a major contibution to the success of the invention. To avoid the disadvantage of the first roller being too large, the first roller preferably has a diameter of at least about 30 inches (75 cm), and not more than about 50 inches (125 cm).

The apparatus may also include means responsive to the approach of a leading edge and subsequent approach of a trailing edge of a glass sheet to the nip to move the second roller towards and away from the first roller when the leading edge is in the nip and when the trailing edge is in the nip respectively.

The provision of this feature reduces the likelihood of the entry of the glass sheet into the nip and its subsequent departure therefrom causing irregularities in the smooth rotation of the first roller which in turn might cause unevenness in the adhesive on the plastic film material as a result of variations in its tension.

The apparatus may include rotating means including a slipping clutch tending to rotate the second roller at a circumferential speed slightly greater than the circumferential speed of the first roller to cause a glass sheet travelling through the nip to tend to travel at a speed slightly greater than the speed of the film material and thereby maintain controlled tension in said film material.

When the plastic film material to be used is not precoated with adhesive, the film material supply means may comprise a liquid adhesive applicator having a liquid adhesive reservoir, means for maintaining liquid adhesive at a predetermined level in the reservoir, a lower roller having a lower portion dipping into the adhesive in the reservoir, means for rotating the lower roller, an upper roller adjacent the lower roller, said film material passing between the upper and lower rollers to cause adhesive to be applied to surface of the film material, and means for adjustably positioning the upper roller relative to the lower roller to adjust its spacing from the lower roller.

Advantageously, the lower roller rotating means operates to rotate the lower roller at a circumferential speed slightly greater than the speed of the film to build up a wedge-shaped body of adhesive between the film and the lower roller.

One embodiment of the invention will now be described, by way of example, with reference to the accompanying drawing which shows a diagrammatic view of apparatus for applying plastic film material to a glass sheet.

Referring to the drawing, glass sheets 12 travel at spaced intervals along a roller conveyor 14, the conveyor rollers being driven at a predetermined suitable speed which will be readily apparent to a person skilled in the art, the glass sheets 12 travelling in a right to left direction in the drawing. The conveyor 14 has a gap 16 above which a large rubber-covered metal roller 18 about 32 inches (81 cm) in diameter is mounted. The rubber covering 19 may for example have a hardness of about 40 shore and a thickness of about 75 inches (1.9 cm). Roller 18 is driven by an electric motor 20. A plastic film 22 with applied adhesive passes around about half the circumference of the roller 18 past electric heaters 23, and the manner in which the film 22 with adhesive is supplied to the roller 18 will now be described.

The plastic film 22, such as that sold under the trade name Solar reflective film, and having a thickness of from about 0.001 to about 0.01 inch (0.025–0.15 mm) is unwound from a supply roll 24 and passes around a sprung dancing roller 26 and an idler roller 28 before approaching an adhesive applicator 30. The adhesive applicator 30 comprises a container 32 in which a suitable liquid adhesive, such as that sold under the trade name NUBOND 1, is pumped by a pump 34 from an adhesive reservoir 36. The container 32 has a weir 38 to maintain the adhesive at a predetermined level, namely the top of the weir 38, with adhesive flowing over the weir 38 being returned to the reservoir 36 by a return pipe 40. Since the adhesive contains a relatively volatile solvent which may partially evaporate by constant circulating, additional solvent is added by the provision of a solvent reservoir 42 from which solvent is allowed to drip into the applicator 30 by adjustment of a tap 44 to an extent which can be determined by reasonable trial and experiment in accordance with ambient conditions.

A first roller 46 dips into adhesive in the container 32, and the second roller 48 is mounted above roller 46 on a swing arm 50. An air cylinder 52 urges the arm 50 downwardly into engagement with an adjustable stop 54 to enable the space between the rollers 46, 48 to be adjusted. Roller 46 is driven by a variable speed DC motor 47, and roller 48 is an idler roller. Both rollers 46, 48 are chrome plated with a smooth finish. From idler 28, the film 22 passes around roller 48 and an idler roller 36 before engaging the large roller 18.

Between rollers 48 and 56, film 22 passes over drying pipes 58 from which warm air is emitted to at least partially compensate for cooling of the film by solvent evaporation.

If desired, a static eliminator may be provided to remove static from the film between the supply roll 24 and adhesive applicator 30. A vacuum head may also be provided to remove dust from the surface of the film to which the additive is to be applied.

Large roller 18 is driven by electric motor 20 to produce a film speed of from about 4 to about 30 ft/min (from about 1.25 to about 9 m/min) with rotation of the roller 18 drawing the film 22 from the supply roll 24 through the adhesive applicator 30. A stop 54 in the adhesive applicator 30 is adjusted so that the spacing between the film 22 and the applicator roller 46 is about equal to the film thickness plus the desired adhesive thickness, the adhesive thickness being for example for about 0.001 to about 0.002 inch (from about 0.025 to about 0.05 mm).

The roller 46 is driven by motor 27 at a circumferential speed slightly greater than the speed of the film 22 so as to build up a wedge-shaped body of adhesive between the film 22 and roller 46, thereby ensuring that the film 22 is thoroughly coated with adhesive. As previously mentioned, the adhesive is maintained at a constant level in container 32, thereby ensuring adequate transport of adhesive from running along the film towards the roller 28.

Since the adhesive solvent is volatile, there may be some evaporation of solvent from the now upper surface of the film 22 as the film 22 travels from the roller 48 to the large roller 18, with the result that the film 22 may be cooled by such evaporation. Accordingly, warm air is blown against the underside of the film 22 from the pipes 58 to compensate for such cooling and avoids condensation on the adhesive surface.

The film 22 with adhesive coating passes around about half the circumference of a large rubber-covered roller 18 from top to bottom thereof. Thus, the film 22 is maintained at an appropriate tension in a wrinkle-free condition by the large surface area of the roller 18 with which the film 22 is in contact, so that the film 22 arrives at the gap 16 in a wrinkle-free condition. The heaters 23 partially dry the adhesive by causing solvent evaporation so that the adhesive is in an optimum condition at the gap 16.

A vertically movable pressure roller 60 is positioned in the gap 16 below the large roller 18, the roller 60 also being a rubber-covered metal roller in the same manner as the large roller 18, but being of substantially smaller diameter, for example, about 8 inches (20 cm). The roller 60 has a shaft 61 driven by a drive chain 62 which in turn is driven by the electric motor 20 through gears, a chain and a slipping clutch in the form of an adjustable torque limiter 64. When pushed upwards against a glass sheet 12, as will be described later, roller 60 is driven at a slightly higher circumferential speed than the large roller 18. However, the speed of roller 60 is reduced to glass sheet speed by slipping of the torque limiter 64.

The roller 60 is mounted on a swing arm 66 which is urged upwardly and downwardly by a diaphragm adjuster 68 connected by air lines to an air pressure valve 70 and pressure control valve (not shown). A limit switch 72 in the path of glass sheets 12 on the conveyor 14 is engaged by the leading edge of the glass sheet 12 to actuate a timer T1 and is caused by passage of the trailing edge of the glass sheet to actuate timer T2. At a first predetermined time after actuation, timer T1 operates pressure valve 70 to cause roller 60 to be moved into engagement with a glass sheet 12, and at a second predetermined time after actuation, timer T2 actuates pressure valve 70 to cause roller 60 to be moved downwardly from the glass sheet. The predetermined times are set such that roller 60 is moved upwardly to engage the leading end portion of a glass sheet and such that roller 60 is moved downwardly away from the glass sheet as its trailing edge passes thereby.

Further details of the apparatus will become apparent from the following description of operation thereof.

Before reaching the vicinity of the rollers 18, 60, each glass sheet 12 passes along conveyor 14 through washing and drying stations (not shown) to ensure that the glass sheet is clean. As each glass sheet 12 then travels along conveyor 14, from right to left in FIG. 1, its leading end operates limit switch 72 with resultant actuation of timer T1. After the predetermined time, when the leading end of the glass sheet 12 is at the lowest point of large roller 18, with the upper surface of the glass sheet 12 engaging the adhesive-coated surface of the film 22, the timer T1 actuates the air pressure valve 70 to cause lower roller 60 to be urged upwardly into resiliently pressured contact with the lower surface of the glass sheet 12, thereby urging the upper surfaces of the glass sheet into good engagement with the adhesive coated side of the film 22.

Since the lower roller 60 tends to move the glass sheet 12 at a slightly higher speed than the speed of the film 22, the film 22 is transferred from the surface of the large roller 18 to the upper surface of the large sheet 12 in light controlled tensioned condition. The rollers 18, 60 have a length greater than the width of the film 22, which in turn has a width greater than the width of the glass sheets 12.

As the trailing end of the glass sheet 12 passes the limit switch 22, timer T2 is actuated with the result that, as the trailing end of the glass sheet 12 is about to leave the nip between the large roller 18 and the lower roller 60, timer T2 operates air pressure valve 70 to lower roller 60.

As mentioned earlier, it is believed that it is the combination of the rubber-like surface 19 and the large diameter of the roller 18, providing a relatively shallow angle of contact of the film 22 with the glass sheet 12, especially upon initial engagement and during disengagement, which provides a major contribution to the prevention of wrinkles in the film 22 when it is applied to the glass sheet 12. More particularly, it is believed that the combination causes the film 22 to be folded down an optimum small amount over the leading edge and over the trailing edge of the glass sheet 12, with there being resilient pressure applied to the film 22 at a slight angle by the rubber covering 19 of the large roller 18.

If lower roller 60 was not raised and lowered with entry and exit of each glass sheet 12 into and from the nip between the two rollers 18, 60, the effect of reactive forces on the large roller 18 may cause an interruption in the regular passage of the film 22 through the adhesive applicator 30, with the result that a transverse line of more or less adhesive may appear on the film. Such variation in adhesive thickness may produce unevenness of the film after its application to the glass sheet. The desired upward and downward movement of the lower roller 60 and timed relation to the approach and departure of each glass sheet 12 from the roller nip prevents such an occurrence. The film 20 is thus applied to each glass sheet 12 in a wrinkle-free manner.

After leaving the roller nip, the glass sheet 12 with attached film 22 continues its passage along the conveyor 14 and is passed through an oven 74 where drying of the adhesive is speed actuated. The edges and sides of the glass sheet are subsequently trimmed by cutters (not shown) to remove excess film.

The glass sheets may typically be about 96 inches (245 cm) long, 60 inches (150 cm) wide and 0.25 inches (0.6 cm) thick. Another advantage of the invention is that, because of the large diameter of the roller 18, the apparatus may be successfully used with glass sheets of somewhat greater or smaller thickness because the shallow angle of contact of the rubber surface 19 of the roller 18 with the glass sheet 12 will not be significantly changed if the thickness of the glass sheet 12 varies somewhat.

For a reason that is not readily understood, it has also been found advantageous if the axis of rotation of the larger rubber 18 is offset in a longitudinal direction beyond the axis of rotation of the small roller 60 by a small amount up to about 0.25 inches (0.6 cm), for example by about 0.1 inch (0.25 cm).

In the embodiment just described, adhesive was applied to the film. Some plastic films are provided with an adhesive already applied and protected by a water-soluble coating. In such a case, the adhesive in the applicator 30 may be replaced by water to remove the protective coating, and if necessary, further water for this purpose may be applied by a spray between roller 28 and the applicator 30.

The film, which may be of any desired colour, may be appropriately printed with wording and/or design before or after application to the glass sheets. The glass sheets may themselves be appropriately printed with wording and/or design before application of the film.

Other embodiments will be readily apparent to a person skilled in the art, the scope of the invention being defined in the appended claims.

I claim:

1. Apparatus for applying plastic film material having a thickness in the range of from about 0.001 to about 0.01 inch to a glass sheet comprising a first roller mounted for rotation about its longitudinal axis, said first roller having a rubber-like surface and a diameter of at least about 30 inches (75 cm), means for rotating the roller about its longitudinal axis, a second roller mounted for rotation about its longitudinal axis adjacent to the first roller to form a nip between the first and second rollers, means for supplying a length of said plastic film material having adhesive on one surface under controlled tension to said first roller at a position remote from the second roller, with the opposite surface of the film material in contact with the first roller, to cause the film material to pass around a substantial portion of the circumference of the first roller to a position adjacent the second roller, and means for feeding the glass sheet through the nip to cause the second roller to press the glass sheet towards the first roller and cause the film material to be adhered to the glass.

2. Apparatus according to claim 1 wherein the first roller has a diameter of at least about 30 inches (75 cm) and not more than about 50 inches (125 cm).

3. Apparatus according to claim 1 including means responsive to the approach of a leading edge and subsequent approach of a trailing edge of a glass sheet to the nip to move the second roller towards and away from the first roller when the leading edge is in the nip and when the trailing edge is in the nip respectively.

4. Apparatus according to claim 1 including rotating means including a slipping clutch tending to rotate the second roller at a circumferential speed slightly greater than the circumferential speed of the first roller to cause a glass sheet travelling through the nip to tend to travel at a speed slightly greater than the speed of the film material and thereby control the tension in said film material.

5. Apparatus according to claim 1 wherein the film material supply means comprises a liquid adhesive applicator having a liquid adhesive reservoir, means for maintaining liquid adhesive at a predetermined level in the reservoir, a lower roller having a lower portion dipping into the adhesive in the reservoir, means for rotating the lower roller, an upper roller adjacent the lower roller, said film material passing between the upper and lower rollers to cause adhesive to be applied to a surface of the film material, and means for adjustably positioning the upper roller relative to the lower roller to adjust its spacing from the lower roller.

6. Apparatus according to claim 1 wherein the film material supply means comprises a liquid adhesive applicator having a liquid adhesive reservoir, means for maintaining liquid adhesive at predetermined level in the reservoir, a lower roller having a lower portion dipping into the adhesive in the reservoir, means for rotating the lower roller, an upper roller adjacent the lower roller, said film material passing between the upper and lower rollers to cause adhesive to be applied to a surface of the film material, said lower roller rotating means operating to rotate the lower roller at a circumferential speed slightly greater than the film to build up a wedge-shaped body of adhesive between the film and the lower roller.

* * * * *